(12) United States Patent
Geldbach et al.

(10) Patent No.: US 8,041,299 B2
(45) Date of Patent: Oct. 18, 2011

(54) COMMUNICATION BASE SYSTEM AND METHOD OF USING THE SAME

(75) Inventors: Erik Geldbach, Olathe, KS (US); Kelsyn Donel Rooks, Sr., Overland Park, KS (US); Shane M. Smith, Paola, KS (US); Mark Wilmoth, Gardner, KS (US)

(73) Assignee: Embarq Holdings Company, LLC, Overland Park, KS (US)

(*) Notice: Subject to any disclaimer, the term of this patent is extended or adjusted under 35 U.S.C. 154(b) by 1005 days.

(21) Appl. No.: 11/985,766

(22) Filed: Nov. 16, 2007

(65) Prior Publication Data
US 2009/0129569 A1 May 21, 2009

(51) Int. Cl.
*H04B 7/00* (2006.01)
(52) U.S. Cl. ........... 455/41.3; 455/3.01; 455/3.04; 455/3.05; 455/3.06; 455/41.2; 455/553.1; 455/557; 455/561; 455/575.2; 370/338; 370/401
(58) Field of Classification Search .......... 455/414.1, 455/424, 425, 41.1, 41.2, 41.3, 507, 508, 455/553.1, 556.1, 556.2, 557, 561, 3.01, 455/3.04, 3.05, 3.06, 550.1, 554.2, 575.2; 370/338, 401, 465, 466, 467; 709/204, 206, 709/217, 238
See application file for complete search history.

(56) References Cited

U.S. PATENT DOCUMENTS

| | | | |
|---|---|---|---|
| 6,757,379 B1 * | 6/2004 | Lane | 379/387.01 |
| 7,813,762 B2 * | 10/2010 | Sanguino et al. | 455/557 |
| 7,912,020 B2 * | 3/2011 | Khasawneh et al. | 370/338 |
| 2002/0016188 A1 * | 2/2002 | Kashiwamura | 455/568 |
| 2005/0282592 A1 * | 12/2005 | Frerking et al. | 455/575.2 |
| 2007/0041582 A1 * | 2/2007 | Lam | 379/908 |
| 2008/0261524 A1 * | 10/2008 | Grushkevich | 455/41.2 |
| 2008/0311988 A1 * | 12/2008 | Smith et al. | 463/36 |

* cited by examiner

*Primary Examiner* — Olumide T Ajibade Akonai
(74) *Attorney, Agent, or Firm* — SNR Denton US LLP

(57) ABSTRACT

In order to enable several wearable devices to communicate with several communication devices over a range of types of networks simultaneously, the illustrative embodiments provide a communication base system and method of using that communication base system. The communication base system includes several network-side transceivers in which each transceiver is configured to communicate with a communication device, a set of user-side transceivers in which each transceiver is configured to communicate with a headset, and a communication path to provide communications between a network-side adapter and a user-side adapter. A processing unit coupled to the communication path is configured to process instructions, where the instructions enable communication between the headset and the communication device without the headset being associated with the communication device.

19 Claims, 4 Drawing Sheets ated States Patent US 8,041,299 B2

COMMUNICATION BASE SYSTEM AND METHOD OF USING THE SAME

BACKGROUND

1. Field of the Invention

The principles of the present invention relate generally to an improved communication system, and in particular, to an improved system and method for interaction with several systems and telecommunication devices. Still more particularly, the principles of the present invention relate to a communication base system and method for using the communication base system.

2. Description of the Related Art

A communication device is a device that may place or receive a telecommunication. The term "communication devices" refers to the collection of all devices usable for telecommunication. For example, a communication device can be the familiar telephone, a computer with a telecommunication enabling software application, which are commonly known as softphones, a telephone-like device that works over data networks instead of a plain old telephone system (POTS) line, a wireless or cellular phone, or any other device used for telecommunication. A communication device is anyone of these communication devices. Communication devices may also include devices and applications capable of communicating in other ways, for example, by text messaging, instant messaging including text, audio, video, images, and documents. Communication devices may further include radio transceivers embedded in appliances, computers, as well as automobiles.

Presently, wearable devices are available that a user can use for interacting with a variety of systems and devices. Some examples of such wearable devices are wired and wireless headsets that include at least a speaker and a microphone. A user may connect these headsets to a device using wires or a wireless protocol, such as Bluetooth, in order to interact with that device. The user can wear the headset and engage in voice telecommunication when the headset is connected with a communication device. The user may also couple the headset with a computer and engage in a voice over Internet Protocol (VOIP) telecommunication using a softphone software application.

As some more examples, a user may use a headset to interact with a gaming console, such as Xbox® manufactured by Microsoft® Corporation, or PlayStation® manufactured by Sony® Corporation. A user may use a headset for dictating a document to speech-to-text software. Wearable headsets integrating a microphone and a speaker are presently used for a variety of activities with a variety of devices.

However, headsets and other devices for similar purposes are presently able to interact with one system or device at a time. The interaction with one device may be over a wired or wireless connection. In one example, when using a Bluetooth headset with a first device, such as a landline phone, the user has to disassociate (e.g., disconnect) the headset from a second device, such as a mobile phone, and associate the headset with the first device. Of course, the headset would need to be pre-registered with each device before associating the headset with either devices.

SUMMARY

In order to enable several wearable devices to communicate with several communication devices over a range of types of networks simultaneously, the illustrative embodiments provide a communication base system and method of using that communication base system. The communication base system includes several network-side transceivers in which each transceiver is configured to communicate with a respective communication device. The communication base system also includes a set of user-side transceivers in which each transceiver is configured to communicate with a headset. A communication path provides communications between a network-side adapter and a user-side adapter. The communication base system further includes a processing unit coupled to the communication path, configured to process instructions, the instructions configured to enable communication between the headset and the communication device without the headset being associated with the communication device.

The communication base system receives a first communication from a first communication device and directs the first communication to a first headset such that the first headset and the first communication device are in communication with each other. The communication base system receives a second communication from a second communication device and directs the second communication to the first headset such that the first headset and the second communication device are in communication with each other. The communication base system processes the first communication by disconnecting the first communication, placing the first communication on hold, linking the first and the second communications to the first headset, or any combination thereof.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

DETAILED DESCRIPTION OF THE DRAWINGS

Illustrative embodiments recognize that users would like to be able to use a single headset for communicating with more than one device without having to engage in a process of disassociating the headset from a previous device, and associating the headset with a new device. The illustrative embodiments further recognize that several users, each with a variation of a headset, may wish to communicate with a common communication device.

Presently, two or more wired headsets may be connected to a computer or a device, such as a music player, by using splitters. Splitters are electrical adapters that include one set of connections that connect to the communication device, and more than one sets of connections, each of which connectable to a headset. However, such splitters are unusable for simultaneously coupling more than one headset that operate on different wiring configurations, wired protocols, wireless configurations, wireless protocols, or any combination thereof. Furthermore, such splitters are not usable when a user wants to use a common headset to communicate with more than one device, where the devices operate on different wiring configurations, wired protocols, wireless configurations, wireless protocols, or any combination thereof.

Therefore, a system that allows one headset to communicate with several communication devices without the user having to perform an association and disassociation of the headset with each device may be useful. Furthermore, the system may allow several headsets to communicate with a common communication device. The illustrative embodiments describe such a system and methods of using that system.

Wired or wireless headsets are just some examples of wearable devices that users use for communication purposes. Many devices facilitate a user's communication with a computer or another device in a manner similar to that of a headset. For example, a desk-microphone and a desk-speaker may facilitate a user's communication with a computer in a manner similar to the wearable headset. For the clarity of the description below, the illustrative embodiments are described with respect to a headset. However, the headsets are not limiting on the illustrative embodiments, and a particular implementation may use any other device that may communicate with communication devices as a headset may communicate with those communication devices.

Figure 1:
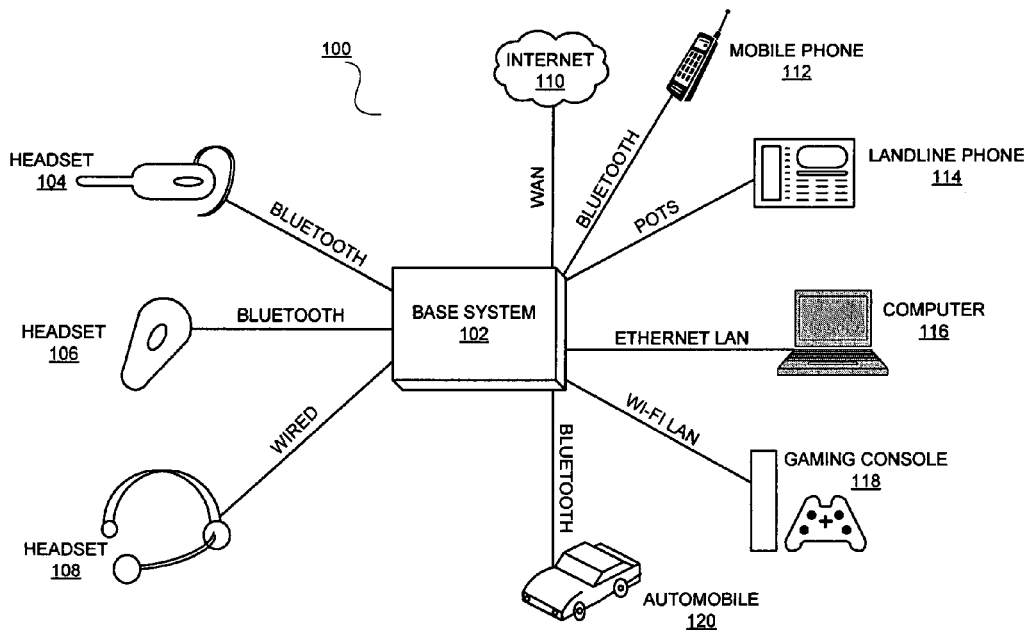
FIG. 1 depicts a system for coupling several headsets and several devices in accordance with an illustrative embodiment.

With reference to FIG. 1, this figure depicts a system for coupling several headsets and several devices in accordance with an illustrative embodiment. System 100 includes base system 102, which is the communication base system according to the illustrative embodiments. Base system 102 is shown to be wirelessly coupled to headset 104 using Bluetooth technology, headset 106 using Bluetooth technology, and headset 108 using a wired connection. Headsets 104-108 are coupled to or in communication with the user-side of base system 102. User-side of base system 102 is a logical side of base system 102 with which a user may couple a headset. For the purposes of this description, a headset or other device being coupled to base system 102 means to be in communication with base system 102 using any means or protocols.

Base system 102 is further shown coupled to several communication devices on the network-side of base system 102. Network side of base system 102 is a logical side of base system 102 with which a user may couple a communication device. For example, base system 102 may couple to Internet 110 over a wide area network (WAN connection, which may be wired or wireless. Base system 102 may further couple to mobile phone 112 over a Bluetooth wireless connection. Base system 102 may further couple to landline phone 114 over a wired plain old telephone system (POTS) connection. Base system 102 may further couple to computer 116 over a wired Ethernet local area network (LAN). Base system 102 may further couple to gaming console 118 over a wireless Wi-Fi connection. Base system 102 may further couple to automobile 120 over a Bluetooth wireless connection.

A user may perform an initial configuration of each of headsets 104-108 and communication devices 110-120 with base system 102. After such configuration, one or more of headsets 104-108 may communicate with one or more of communication devices 110-120 via base system 102 without a user having to perform associations and disassociations between each headset and the communication device. The communication devices and headsets depicted in FIG. 1 are exemplary and not intended to be limiting on the illustrative embodiments. Many other types of devices may be coupled to base system 102 on the user-side, and many other communication devices may be coupled to base system 102 on the network-side without departing from the scope of the illustrative embodiments.

Figure 2:
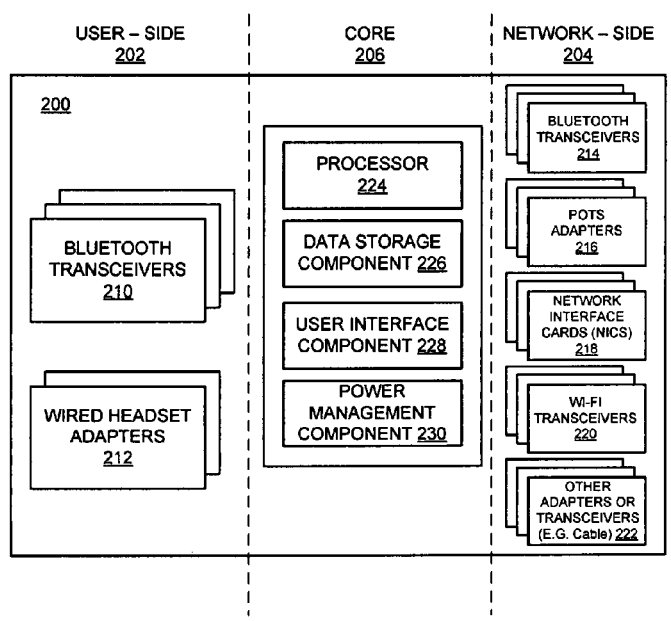
FIG. 2 depicts a block diagram of a base system in accordance with an illustrative embodiment.

With reference to FIG. 2, this figure depicts a block diagram of a base system in accordance with an illustrative embodiment. Base system 200 may be base system 102 in FIG. 1. Base system 200 shows user-side 202, network-side 204, and core 206.

User-side 202 of base system 200 may include one or more transceivers, each transceiver configured to enable a headset to communicate with base system 200 using a particular wired or wireless configuration or protocol. For example, user-side 202 may include one or more Bluetooth transceivers 210, and one or more wired headset adapters 212.

Similarly, network-side 204 may include one or more Bluetooth transceivers 214, one or more POTS adapters 216, one or more network interface cards (NIC) 218, one or more WWi-Fi transceivers 220. Network-side 204 may also include one or more other adapters or transceivers 222, such as a coaxial cable adapter or other custom adapter or transceiver. Each adapter or transceiver on network-side 204 may communicate with a communication device over a network. The network may be wired or wireless and the network may use any protocol or configuration for communicating with a communication device.

Core 206 of base system 200 may include processor 224, data storage component 226, and user interface component 228. Core 206 may optionally include power management component 230. User interface component 228 may enable a user to configure base system 200, such as by inputting instructions. Data storage component 226 may store such configuration, such as by storing the inputted instructions. Processor 224 may perform the functions of base system 200 according to the user's configuration, such as by executing the stored instructions. For example, a communication device may connect to base system 200 using a Wi-Fi protocol and a headset may connect to base system 200 using Bluetooth protocol. Processor 224 may execute instructions stored in data storage component 226 in order to convert the data from one protocol to another while enabling communication between a communication device and a headset. Power management component 230 may provide electrical power drawn by various components of base system 200.

A communication path (not shown) may provide data communication pathway between the network-side transceivers and the user-side transceivers. The communication path may further communicate with the core components, such as to enable the processor to perform data processing on the data being transported on the communication path.

Figure 3:
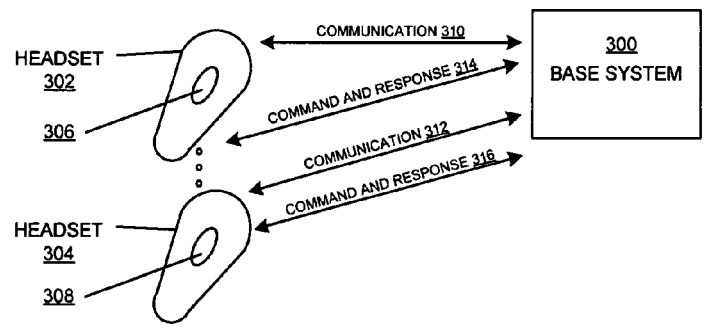
FIG. 3 depicts a block diagram of interactions between one or more headsets and a base system in accordance with an illustrative embodiment.

With reference to FIG. 3, this figure depicts a block diagram of interactions between one or more headsets and a base system in accordance with an illustrative embodiment. Base system 300 may be implemented using base system 200 in FIG. 2. Each of headsets 302 and 304 may be implemented using any of headsets 104-108 in FIG. 1. Headset 302 may include button 306 and headset 304 may include button 308. Buttons 306 and 308 are mechanisms for performing a function on the respective headset or on a communication device with which the respective headset may be in communication as understood in the art.

A headset 302 may enable a user to have communication 310, such as a voice communication over a telephone, via base system 300. Headset 304 may similarly enable a second user to have communication 312 via base system 300. Headset 302 may exchange command and response 314 with base system 300. For example, headset 302 may send a command to base system 300, and base system 300 may return a response to headset 302. Headset 304 may similarly exchange command and response 316 with base system 300.

The following examples illustrate the command and response activity depicted as command and response 314 and 316. Using headset 304 as an exemplary Bluetooth headset, headset 304 may be coupled to base system 300 using a Bluetooth transceiver, such as a Bluetooth transceiver from Bluetooth transceivers 210 in FIG. 2. As an example, a user may configure base system 300 to receive a command corresponding to a single tap of button 306 on headset 304 via one of user-side Bluetooth transceivers and place a call on hold on a landline phone that may be coupled to base system 300 using one of network-side POTS adapters in base system 300. As another example, the user may further configure base system 300 to receive a command corresponding to double-tap of button 306 and switch to a second call that may be waiting on a mobile phone that may be coupled to base system 300 using one of network-side Bluetooth transceivers in base system 300. As another example, the user may further configure base system 300 to receive a long tap of button 306 and launch a software application on a computer that may be coupled to base system 300 using one of the network-side NICs in base system 300. As another example, the user may also configure base system 300 to couple to two Bluetooth headsets, namely headsets 302 and 304, using two user-side Bluetooth transceivers, and allow both headsets to communicate with a single voice over internet protocol (VOIP) phone that may be coupled to base system 300 using one of Wi-Fi transceivers in base system 300.

Base system 300 may also send commands to headsets, such headset 302. For example, a base system 300 may instruct headset 302 to automatically pick up a call when an incoming call is directed to the headset. Headset 302 may respond to base system 300 by an acknowledgment of the command and/or actually picking up a call. Many other commands may similarly be sent and responses received to and from base system 300.

The user may perform these and other configurations using user interface component 228. Above configurations are described only as exemplary and are not limiting on the illustrative embodiments. Many other commands and response, functions, actions, tasks, events, and uses may be configured in base system 300 without departing from the scope of the illustrative embodiments. For example, the user may configure base system 300 to receive a tap-and-hold of button 306, start a recording application on a computer to record the conversation on the headset, and send an email notification to another user about the ongoing conversation.

Figure 4:
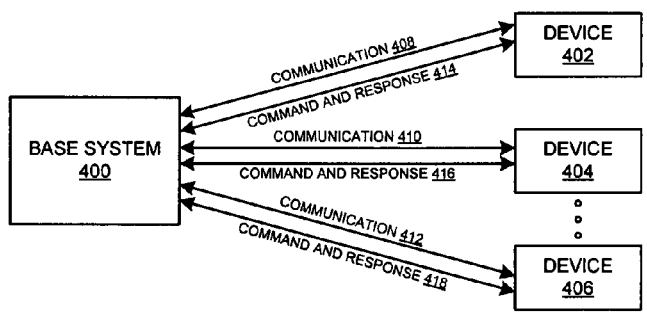
FIG. 4 depicts a block diagram of interactions between one or more communication devices and a base system in accordance with an illustrative embodiment.

With reference to FIG. 4, this figure depicts a block diagram of interactions between one or more communication devices and a base system in accordance with an illustrative embodiment. Base system 400 may be implemented using base system 300 in FIG. 3. Each of communication devices 402, 404, and 406 may be any communication device that communicates over any communication network. For example, the communication devices may include any device that communicates over the Internet, such as a computer, a gaming console, and a VOIP phone. The communication devices may further include mobile phone 112, landline phone 114, computer 116, gaming console 118, or automobile 120 in FIG. 1, or any other communication device that is similarly usable.

Base system 400 may facilitate communication 408 with communication device 402, communication 410 with communication device 404 and communication 412 with communication device 406. For example, communication 408 with device 402 may be related to communication 310 that a user may be engaged in using headset 302 in FIG. 3.

Base system 400 may also send and receive command and response 414 to and from communication device 402, command and response 416 to and from communication device 404, and command and response 416 to and from communication device 406. For example, upon receiving a command from a headset to start a recording application on a computer, base system 400 may send a "launch application" command to communication device 402, which may be a computer including the recording application. The computer may respond with a notification of successful initiation of recording to base system 400. Many other commands and responses are similarly configurable in a specific configuration of base system 400.

Furthermore, a command sent from base system 400 to a communication device, such as communication device 402, may or may not correspond to a command originating from a headset. Some examples of such commands may be status check, range verification, notification, and battery test. Many other commands may similarly be configured in specific implementations. Base system may autonomously send commands to communication devices for performing certain configured functions. Additionally, base system 400 may or may not pass a response received from a communication device to a headset.

Base system 400 may also accept commands from communication devices, such as communication device 402. For example, a computer may instruct base system 400 to shut down at a specified time by sending a command to base system 400. Base system 400 may respond to the computer by an acknowledgment of the command and shutting down. Many other commands may similarly be sent and responses received to and from base system 400. The commands and responses described above are only exemplary and not limiting on the illustrative embodiments. Many other commands and responses are conceivable from this disclosure.

Figure 5:
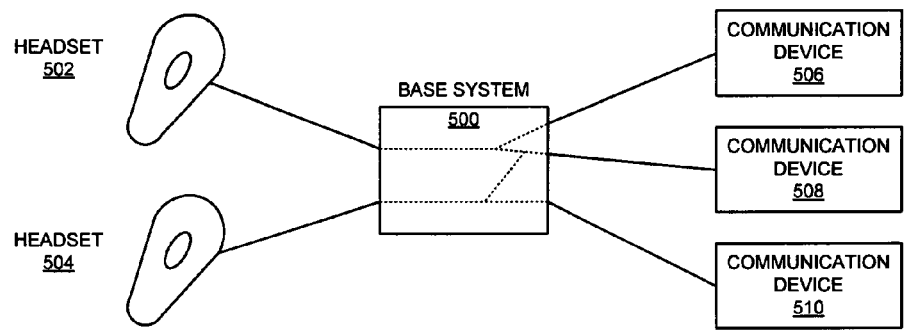
FIG. 5 depicts a block diagram of a telecommunication system using a base system in accordance with an illustrative embodiment.

With reference to FIG. 5, this figure depicts a block diagram of a telecommunication system using a base system in accordance with an illustrative embodiment. Base system 500 may be implemented using base system 400 in FIG. 4. Headsets 502 and 504 may be similar to any of headsets 302 and 304 in FIG. 3. Communication devices 506, 508, and 510 may be each similar to any of communication devices 402, 404, and 406 in FIG. 4.

In a telecommunication system using base system 500 in the manner depicted in FIG. 5, headset 502 may be able to interact with communication devices 506 and 508 simultaneously, or switch from communication device 506 to 508, and vice versa. Headset 502 may be able to perform these functions without the user having to associate or disassociate headset 502 with communication device 506 and 508 one at a time. Similarly, headset 504 may be able to interact with communication device 510, or participate in a communication between headset 502 and communication device 508. Note that a headset may be able to send and receive commands and responses to and from base system 500 or any of the communication devices the headset may be in communication with, based on the configuration of base system 500. The interactions between headsets 502 and 504, base system 500, and the various communication devices are described only as exemplary. Many other interactions, communications, and configurations are conceivable from this disclosure.

Figure 6:
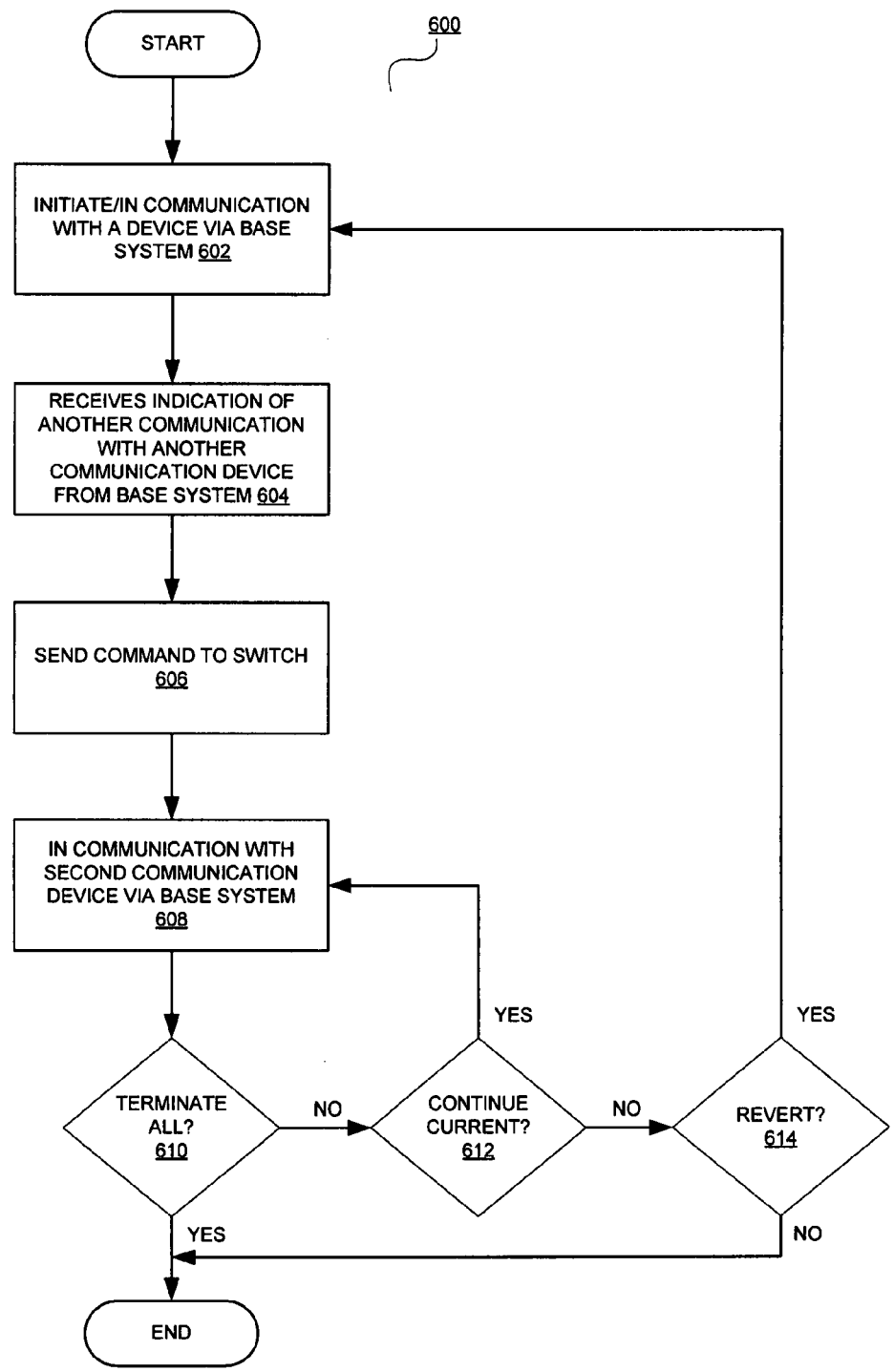
FIG. 6 depicts a flowchart of a process for enabling a headset to communicate with several communication devices in accordance with an illustrative embodiment.

With reference to FIG. 6, this figure depicts a flowchart of a process for enabling a headset to communicate with several communication devices in accordance with an illustrative embodiment. The process may be implemented using headset 502 in FIG. 5.

Process 600 begins by initiating a communication with a communication device via a base system, such as base system 500 in FIG. 5 (step 602). Step 602 may also include being in a communication that may have been previously initiated via the base system. The process may receive an indication of a second communication being received from a second communication device (step 604). The process may send a command to the base system to switch from the first communication to the second (step 606). The process may then establish communication with the second communication device (step 608). In one embodiment, step 606 may switch from the first communication to the second, connect both communications, or some combination thereof in case of more than two communications. In another embodiment, the process may also notify the user via the headset of the pending communications, switching actions, and connecting actions. In another embodiment, the process may send the command of step 606 automatically or upon an input from the user of the headset.

Process 600 may determine whether all communications should be terminated (step 610). If the process determines that all communications should not be terminated ("No" path of step 610), the process then determines if the current communication, the second communication in this example, should be continued (step 612). If the process determines that the current communication should continue, ("Yes" path of step 612), the process returns to step 608.

If, however, the process determines that the current communication should not be continued ("No" path of step 612), the process then determines if the process should revert to the previous communication, such as by terminating the current communication or by placing the current communication on hold (step 614). If the process determines that the process should revert ("yes" path of step 614), the process returns to step 602.

If the process determines that the process should not revert to the previous communication ("No" path of step 614) the process ends. If the process determines in step 610 that all communications should be terminated ("Yes" path of step 610), the process ends thereafter.

Figure 7:
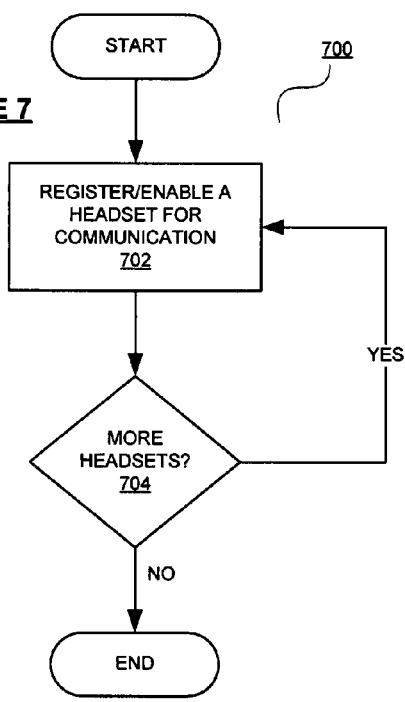
FIG. 7 depicts a flowchart of a process of enabling a headset for communication via a base system in accordance with an illustrative embodiment.

With reference to FIG. 7, this figure depicts a flowchart of a process of enabling a headset for communication via a base system in accordance with an illustrative embodiment. Process 700 may be implemented in a base system, such as base system 500 in FIG. 5. Process 700 may be understood as being similar to the presently-used process of registering a headset with a communication device, but different from the presently-used registration in that the headset is not registered with a communication device but with a base system.

Process 700 begins by registering a headset, such as headset 502 in FIG. 5, for communications via the base system (Step 702). The registration step 802 may include connecting a headset with wires or wirelessly with the base system. The process determines if more headsets, such as headset 504 in FIG. 5, are to be registered (step 704). If the process determines that more headsets are to be registered ("Yes' path of step 704), the process returns to step 702. If the process determines that no more headsets are to be registered ("No" path of step 704), the process ends thereafter.

Figure 8:
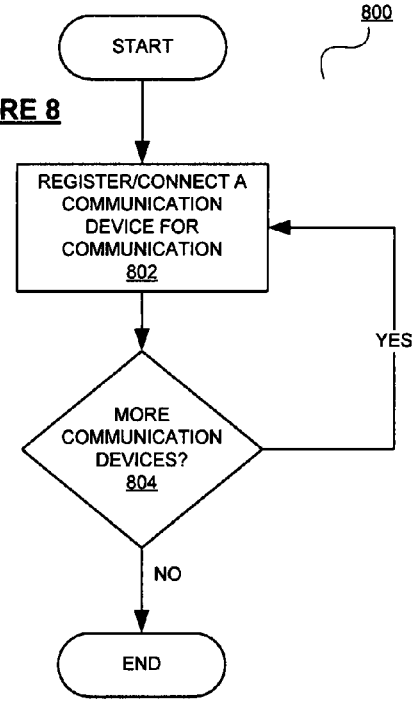
FIG. 8 depicts a flowchart of a process of enabling a communication device for communication via a base system in accordance with an illustrative embodiment.

With reference to FIG. 8, this figure depicts a flowchart of a process of enabling a communication device for communication via a base system in accordance with an illustrative embodiment. Process 800 may be implemented in a base system, such as base system 500 in FIG. 5.

Process 800 begins by registering a communication device, such as communication device 506 in FIG. 5, for communications via the base system (Step 802). The registration step 802 may include connecting a communication device with wires or wirelessly with the base system. The process determines if more communication devices, such as communication device 508 in FIG. 5, are to be registered (step 804). If the process determines that more communication devices are to be registered ("Yes' path of step 804), the process returns to step 802. If the process determines that no more communication devices are to be registered ("No" path of step 804), the process ends thereafter.

Figure 9:
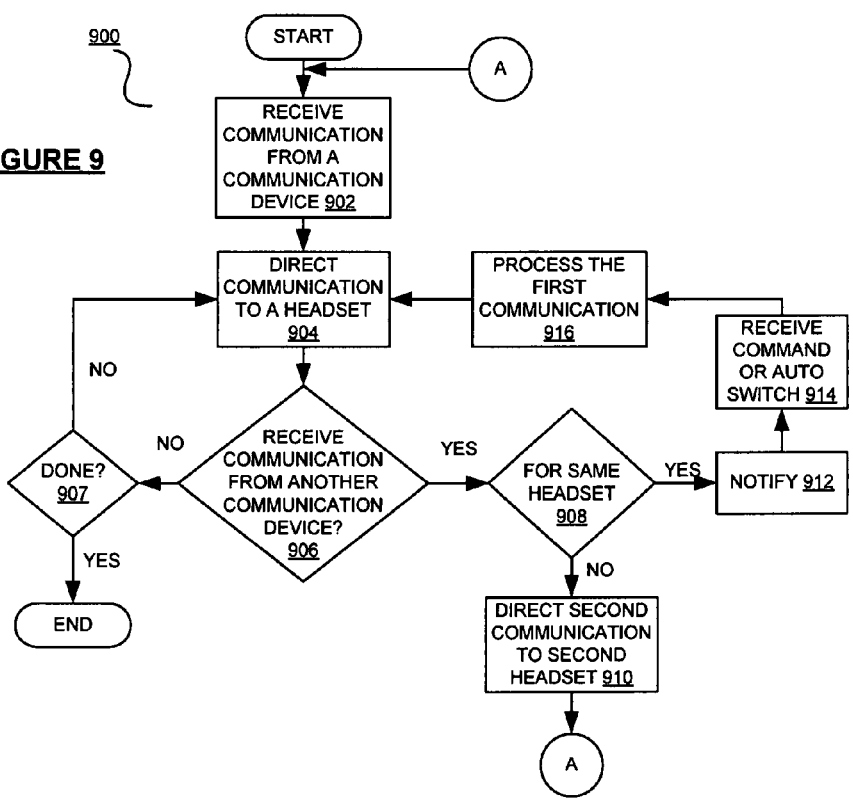
FIG. 9 depicts a process of managing communications amongst several headsets and several communication devices in accordance with an illustrative embodiment.

With reference to FIG. 9, this figure depicts a process of managing communications amongst several headsets and several communication devices in accordance with an illustrative embodiment. Process 900 may be implemented in a base system, such as base system 500 in FIG. 5.

Process 900 begins by receiving a communication from a communication device, such as communication device 506 in FIG. 5 (step 902). The process directs the communication to a headset, such as headset 502 in FIG. 2 (step 904). The process determines if another communication from another communication device is to be received (step 906). If another communication is not present, or not to be received ("No" path of step 906), the process determines if the communication of step 904 is over (step 907). If the communication is not over ("No" path of step 907), the process returns to step 904. If the communication is over, ("Yes" path of step 907), the process ends.

Returning to step 906, if another communication is to be received ("Yes" path of step 906), the process determines if the other communication is to be directed to the same headset as in step 904 (Step 908). If the other communication is to be directed to a headset distinct from the headset in step 904, (No" path of step 908), the process directs the second communication to a second headset (Step 910). The process, with respect to the second communication and the second headset, then returns to step 902.

Returning to step 908, if the second communication is for the same headset as in step 904, ("Yes" path of step 908), the process may notify the headset (step 912). Step 912 may be omitted in particular implementations of process 900. The process may then either receive a command to switch the headset from the first communication to the second communication, or perform the switch automatically (step 914). In order to switch the headset from the first communication to the second, the process may have to perform some processing of the first communication, such as place the first call on hold, terminate the first communication, or link the first and the second communication (step 916). Particular implementations of process 900 may process the first and second communications in any manner suitable for that implementation. The process then returns to step 904 with respect to the second communication.

The steps of processes 600-900 have been described only as exemplary. Particular implementations of these processes may combine, further subdivide, modify, substitute, or omit particular steps without departing from the scope of the illustrative embodiments. Furthermore, these processes may be modified to include, or used in combination with, other conventional processes, such as switching from a headset to a speaker phone. A conventional process is a process that is commonly employed using communication devices. These processes may also be modified to include, or used in combination with unconventional implementation specific processes. An unconventional process is a process not presently commonly employed using communication devices.

Thus, the illustrative embodiments provide a communication base system and methods of using that base system for enabling communication and interactions between one or more headsets and several communication devices. The illustrative embodiments enable these communication and interactions without associating or disassociating a headset with each communication device. The illustrative embodiments allow several headsets and several communication devices to communicate with each other simultaneously without the limitation of one-headset-to-one-communication-device association as is presently required.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed:

1. A communication base system comprising:
   a plurality of network-side transceivers, each transceiver in the set of network-side transceivers configured to communicate with a respective communication device;
   a set of user-side transceivers, each transceiver in the set of user-side transceivers configured to communicate with a headset;
   at least one communication path coupling a network-side transceiver in the plurality of network-side transceivers and a user-side transceiver in the set of user-side transceivers, and being configurable to provide communications between the network-side transceiver and the user-side transceiver; and
   a processing unit in communication with the communication path and being configured to process instructions, the instructions configured to enable communication between the headset and the communication device without the headset being associated with the communication device, the instructions further configured to enable simultaneous communication between a plurality of headsets and a plurality of communication devices, to switch a headset in the plurality of headsets from communication with a first communication device in the plurality of communication devices to communication with a second communication device in the plurality of communication devices, and to manage communications with the first and second communication devices.

2. The communication base system of claim 1, wherein the set of network-side transceivers includes one or more of a transceiver configured to communicate with a data network wirelessly, an adapter configured to communicate with a telephone network and a network interface card configured to communicate with a wired data network.

3. The communication base system of claim 1, wherein the set of user-side transceivers includes one or more of a transceiver configured to communicate with a headset over a wireless network, an adapter configured to communicate with a wired headset.

4. The communication base system of claim 1, further comprising:
   a data storage configured to store data, the data including one or more of the instructions, data resulting from the processing of the instructions, data received from the headset, and data received from the device; and
   a user interface component configured to enable a user to manipulate one of the data, the configuration of a transceiver in the set of network-side transceivers, and the configuration of a transceiver in the set of user-side transceivers.

5. The communication base system of claim 1, configured to enable simultaneous communication between a headset and a plurality of communication devices, wherein the plurality of communication devices includes communication devices on one or more of a common network and distinct networks.

6. The communication base system of claim 1, configured to enable simultaneous communication between a plurality of headsets and a communication device, wherein the plurality of headsets includes headsets on one or more of a common network and distinct networks.

7. A method for using a communication base system, the method comprising: receiving a first communication from a first communication device; directing the first communication to a first headset such that the first headset and the first communication device are in communication with each other; receiving a second communication from a second communication device; directing the second communication to the first headset such that the first headset and the second communication device are in communication with each other; and processing the first communication by disconnecting the first communication or by placing the first communication on hold, wherein the first headset is in communication with the first and second communication devices without being associated with the first and second communication devices.

8. The method of claim 7, wherein directing the second communication occurs in response to a command from the first headset.

9. The method of claim 7, further comprising:
directing the second communication to a second headset instead of the first headset or in addition to the first headset.

10. The method of claim 7, further comprising:
enabling at least one headset to operate with the communication base system; and
enabling at least one communication device to operate with the communication base system.

11. The method of claim 7, further comprising:
receiving a command from the first headset; and
performing an operation corresponding to the command, wherein the operation is configured in the communication base system.

12. The method of claim 11, further comprising:
providing a response to the first headset responsive to the command.

13. A computer usable program product in a non-transitory tangible computer readable medium storing computer executable instructions for using a communication base system that, when executed, cause the communication base system to: receive a first communication from a first communication device; direct the first communication to a first headset such that the first headset and the first communication device are in communication with each other; receive a second communication from a second communication device; direct the second communication to the first headset such that the first headset and the second communication device are in communication with each other; and process the first communication by disconnecting the first communication or by placing the first communication on hold, wherein the instructions cause the first headset to be in communication with the first and second communication devices without being associated with the first and second communication devices.

14. The computer usable program product of claim 13, wherein the instructions cause the directing of the second communication to occur in response to a command from the first headset.

15. The computer usable program product of claim 13, further including instructions that when executed cause the communication base system to:
direct the second communication to a second headset instead of the first headset or in addition to the first headset.

16. The computer usable program product of claim 13, further including instructions that when executed cause the communication base system to:
receive a command from the first headset;
perform an operation corresponding to the command, wherein the operation is configured in the communication base system; and
provide a response to the first headset responsive to the command.

17. A communication base system comprising:
a plurality of network-side transceivers, each transceiver in the set of network-side transceivers configured to communicate with a respective communication device;
a set of user-side transceivers, each transceiver in the set of user-side transceivers configured to communicate with a headset;
at least one communication path coupling a network-side transceiver in the plurality of network-side transceivers and a user-side transceiver in the set of user-side transceivers, and being configurable to provide communications between the network-side transceiver and the user-side transceiver;
a processing unit in communication with the communication path and being configured to process instructions, the instructions configured to enable communication between the headset and the communication device without the headset being associated with the communication device;
a data storage configured to store data, the data including one or more of the instructions, data resulting from the processing of the instructions, data received from the headset, and data received from the device; and
a user interface component configured to enable a user to manipulate one of the data, the configuration of a transceiver in the set of network-side transceivers, and the configuration of a transceiver in the set of user-side transceivers.

18. A communication base system comprising:
a plurality of network-side transceivers, each transceiver in the set of network-side transceivers configured to communicate with a respective communication device;
a set of user-side transceivers, each transceiver in the set of user-side transceivers configured to communicate with a headset;
at least one communication path coupling a network-side transceiver in the plurality of network-side transceivers and a user-side transceiver in the set of user-side transceivers, and being configurable to provide communications between the network-side transceiver and the user-side transceiver; and
a processing unit in communication with the communication path and being configured to process instructions, the instructions configured to enable communication between the headset and the communication device without the headset being associated with the communication device, and to enable simultaneous communication between a headset and a plurality of communication devices, wherein the plurality of communication devices includes communication devices on one or more of a common network and distinct networks.

19. A communication base system comprising:
a plurality of network-side transceivers, each transceiver in the set of network-side transceivers configured to communicate with a respective communication device;
a set of user-side transceivers, each transceiver in the set of user-side transceivers configured to communicate with a headset;
at least one communication path coupling a network-side transceiver in the plurality of network-side transceivers and a user-side transceiver in the set of user-side transceivers, and being configurable to provide communications between the network-side transceiver and the user-side transceiver; and
a processing unit in communication with the communication path and being configured to process instructions, the instructions configured to enable communication between the headset and the communication device without the headset being associated with the communication device, and to enable simultaneous communication between a plurality of headsets and a communication device, wherein the plurality of headsets includes headsets on one or more of a common network and distinct networks.

* * * * *